UNITED STATES PATENT OFFICE.

EDWARD F. OVERDEER, OF CHATTANOOGA, TENNESSEE.

IMPROVEMENT IN FIRE-EXTINGUISHING COMPOSITIONS.

Specification forming part of Letters Patent No. 12,519, dated March 13, 1855.

*To all whom it may concern:*

Be it known that I, EDWARD F. OVERDEER, of Chattanooga, in the county of Hamilton and State of Tennessee, have invented an Improved Mode of Preventing Houses, &c., from being Destroyed by Fire; and I do hereby declare that the following is a full and exact description thereof.

The nature of my invention consists in employing a solution of pearlash in water, in the proportion of sixteen pounds of pearlash, or thereabout, to one hundred gallons of water, as a substitute for water for the purpose of extinguishing fires. I make a solution by dissolving the common pearlash of commerce in hot water, in the proportion of sixteen pounds of pearlash, or thereabout, to one hundred gallons of water, making a sufficient quantity to serve the purpose required. The proportion above given may be varied somewhat and still produce the required effect; but I believe substantially that proportion to be the best.

Instead of pearlash alone, I sometimes add a small quantity of saleratus, using the proportion of fifteen pounds of pearlash and one pound of saleratus to one hundred gallons of water. This compound I find to be efficacious; but the saleratus is not necessary to produce the desired effect.

When a house or other building is on fire I make use of the above solution as a substitute for water, employing the ordinary fire-engine for the purpose, or applying the liquid to the burning building in any other usual or convenient manner.

The common fire-engine requires no alteration to adapt it to the use of the solution, as the strength thereof is not sufficient to destroy the lubricant of the pistons or to corrode any part.

I am aware that pearlash and other salts, either alone or mixed with other substances, have been used to saturate or cover combustible articles to render them fire-proof. Therefore I do not claim the use of pearlash or saleratus for the purpose of preventing ignition, or rendering combustible articles fire-proof; but

What I claim as my invention, and desire to secure by Letters Patent, is—

The employment of a solution of pearlash in water, in the proportion of sixteen pounds of pearlash, or thereabout, to one hundred gallons of water, as a substitute for water in extinguishing fires.

The above amended specification of my improved mode of preventing houses, &c., from being destroyed by fire signed by me this 31st day of January, 1855.

EDWARD F. OVERDEER.

Witnesses:
 HENRY T. ABRAHAMS,
 J. J. BRYAN.